US012590275B2

(12) United States Patent
Gardner

(10) Patent No.: US 12,590,275 B2
(45) Date of Patent: Mar. 31, 2026

(54) BEVERAGES COMPOSED OF FRUIT AND/OR VEGETABLE COMPONENTS

(71) Applicant: Susanne Gardner, Atlanta, GA (US)

(72) Inventor: Susanne Gardner, Atlanta, GA (US)

( * ) Notice: Subject to any disclaimer, the term of this patent is extended or adjusted under 35 U.S.C. 154(b) by 0 days.

(21) Appl. No.: 18/676,734

(22) Filed: May 29, 2024

(65) Prior Publication Data

US 2024/0309302 A1 Sep. 19, 2024

Related U.S. Application Data

(62) Division of application No. 14/053,048, filed on Oct. 14, 2013, now Pat. No. 12,018,238.

(60) Provisional application No. 61/712,848, filed on Oct. 12, 2012.

(51) Int. Cl.

| | |
|---|---|
| *A61K 38/12* | (2006.01) |
| *A23C 9/156* | (2006.01) |
| *A23F 3/40* | (2006.01) |
| *A23L 2/02* | (2006.01) |
| *C12G 1/00* | (2019.01) |
| *C12G 3/06* | (2006.01) |

(52) U.S. Cl.
CPC ............... *C12G 1/00* (2013.01); *A23C 9/156* (2013.01); *A23F 3/405* (2013.01); *A23L 2/02* (2013.01); *C12G 3/06* (2013.01)

(58) Field of Classification Search
CPC .. C12G 1/00; C12G 3/06; A23C 9/156; A23F 3/405; A23L 2/02
USPC ......................................................... 426/66
See application file for complete search history.

(56) References Cited

U.S. PATENT DOCUMENTS

| | | | |
|---|---|---|---|
| 1,717,685 | A | 6/1929 | Herman |
| 4,497,842 | A | 2/1985 | Ehrlich et al. |
| 4,534,991 | A | 8/1985 | Kryger |
| 4,626,437 | A | 12/1986 | Schobinger et al. |
| 4,643,083 | A | 2/1987 | Boucher |
| 4,812,232 | A | 3/1989 | Weiss |
| H621 | H | 4/1989 | Gay |
| 4,888,189 | A | 12/1989 | Gnekow |
| 4,946,701 | A | 8/1990 | Tsai et al. |
| 4,978,547 | A | 12/1990 | Petershans |
| 5,437,880 | A | 8/1995 | Takaichi et al. |
| 5,897,904 | A | 4/1999 | Friedman |
| 6,099,854 | A | 8/2000 | Howard et al. |
| 7,229,658 | B1 | 6/2007 | Inoue et al. |
| 2004/0091589 | A1 | 5/2004 | Roy et al. |
| 2004/0166179 | A1 | 8/2004 | Anzaghi et al. |
| 2005/0002992 | A1 | 1/2005 | McCleary et al. |
| 2008/0221003 | A1 | 9/2008 | Meine et al. |
| 2009/0087526 | A1 | 4/2009 | Taniguchi et al. |
| 2009/0196951 | A1 | 8/2009 | Brandborg |
| 2009/0297681 | A1 | 12/2009 | Wilkes et al. |
| 2009/0311381 | A1 | 12/2009 | Gardner |
| 2010/0119667 | A1 | 5/2010 | Livaich |
| 2011/0028426 | A1 | 2/2011 | Trudsoe et al. |
| 2012/0164300 | A1 | 6/2012 | Niazi |

FOREIGN PATENT DOCUMENTS

| | | | |
|---|---|---|---|
| FR | 2767533 A1 | 2/1999 | |
| GB | 190022592 A | 4/1901 | |
| GB | 2166335 A | 5/1986 | |
| JP | 2005143377 A | 6/2005 | |
| JP | 2006067951 A | * 3/2006 | |
| WO | 2006109200 A2 | 10/2006 | |
| WO | 2007048471 A1 | 5/2007 | |
| WO | 2009032323 A1 | 3/2009 | |

OTHER PUBLICATIONS

Translation of JP-2006067951-A (Year: 2006).*
Spiced Wine by Mary Cadogan https://www.bbcgoodfood.com/recipes/spiced-wine (Year: 2010).
Herbst (Mulled Wine, from www.cookstr.com, published on Dec. 16, 2008) https://www.cookstr.com/recipes/mulled-wine (Year: 2008).
YoBrew (Mulled Wine, from www.yobrew.co.uk/, published on Jul. 3, 2008) https://www.yobrew.co.uk/mulled.php (Year: 2008).
"Red wine and resveratrol: Good for your heart?" MayoClinic.org. (dated Mar. 4, 2011). https ://www .mayoclinic.org/diseases-conditions/heart-disease/i n-depth/red-wine/art-20048281 (Year: 2011).
"Jail house hooch" recipe by Nick Plumber, Jan. 2016, 7 pages, https://drunkard.com/11-03-jailhouse-3/.
The Composition of Commercial Fruit Extracts Walter S. Long, Transactions of the Kansas Academy of Science (1903-) vol. 28 (Jan. 14, 1916-Jan. 13, 1917), pp. 157-161 (5 pages).
http://members.echocommunity.org/resource/resmgr/a_to_z/azch2pt3.htm, pp. 1-5, 1987.
European Search Report for application No. PCT/US2009/046892 dated Jul. 29, 2011.

(Continued)

*Primary Examiner* — Brent T O'Hern

(74) *Attorney, Agent, or Firm* — Thomas | Horstemeyer, LLP

(57) ABSTRACT

Described herein are beverages composed of components derived from fruits and/or vegetables by way of percolation and/or maceration with alcoholic beverages. The inventive beverages include additional additives such as one or more sweeteners, glycerol, sugar alcohols, herbs, spices, vitamins, antioxidants, flavoring agents, acids, or any combination thereof. The methods described herein maximize the isolation of bioactive nutrients present in fruits and vegetables and form unique complexes with chemosensory flavor elements. Also disclosed herein are fruit and vegetable composites by way of percolation and/or maceration of the fruit or vegetable with alcoholic beverages, wherein the composites can be used to supplement a beverage.

21 Claims, No Drawings

(56)                References Cited

OTHER PUBLICATIONS

International Search Report and Written Opinion for application No. PCT/US09/46892 dated Aug. 27, 2009.
Vinson, "Red wine, dealcoholized red wine, and especially grape juice, inhibit atherosclerosis in a hamster model", Atherosclerosis, 156, 2001, 67-72.

* cited by examiner

BEVERAGES COMPOSED OF FRUIT AND/OR VEGETABLE COMPONENTS

CROSS REFERENCE TO RELATED APPLICATIONS

This application is a divisional application of U.S. non-provisional application Ser. No. 14/053,048, filed Oct. 14, 2013, which has issued as U.S. Pat. No. 12,018,238 on Jun. 25, 2024, which claims priority upon U.S. provisional application Ser. No. 61/712,848, filed Oct. 12, 2012. This application is hereby incorporated by reference in its entirety.

SUMMARY

Described herein are beverages composed of components derived from fruits and/or vegetables by way of percolation and/or maceration with alcoholic beverages containing chemical moieties of various flavors. The beverages include additional additives such as one or more sweeteners, glycerol, sugar alcohols, herbs, spices, vitamins, antioxidants, flavoring agents, acids, or any combination thereof. The methods described herein maximize the isolation of bioactive nutrients present in fruits and vegetables. The methods described herein foster the molecular bonding between alcoholic flavor chemical moieties, bioactive nutrients present in fruits and vegetables, and chemical moieties in additives described below such as spices, herbs and vitamins. Also disclosed herein are fruit and vegetable composites by way of percolation and/or maceration of the fruit or vegetable with alcoholic beverages, wherein the composites can be used to supplement a beverage.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present compositions and methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "an additive" includes mixtures of two or more such components, and the like.

"Optional" or "optionally" means that the subsequently described event or circumstance can or cannot occur, and that the description includes instances where the event or circumstance occurs and instances where it does not.

Described herein are beverages composed of components derived from fruits and/or vegetables by way of percolation and/or maceration with alcoholic beverages. The methods described herein are efficient in isolating nutrients present in fruits and vegetables that provide health benefits and in forming chemical complexes between unique flavor entities and bionutrients.

In one aspect, the beverage is produced by (a) percolating or macerating the fruit or vegetable with an alcoholic beverage, wherein the fruit and vegetable or any portion thereof is not heated prior to percolation or maceration, to produce a liquid component and a solid component;

(b) separating the liquid component from the solid component; and (c) adding one or more sweeteners, glycerol, sugar alcohols, herbs, spices, vitamins, antioxidants, flavoring agents, acids, or any combination thereof (i) before step (a); (ii) during step (a); (iii) to the liquid component after step (b), or any combination thereof, to produce the beverage.

Details regarding the steps and materials used to produce the beverages described herein are provided below.

The first step involves the selection of the appropriate fruit and or vegetable to be used. The selection can vary depending upon the final beverage to be produced.

In one aspect, the fruits can be of the classification of: berries such as, but not limited, to raspberries, blackberries; pomes such as apples or pears; drupes such as cherries or plums. These include, but are not limited to, the classifications of genus Apteryx, Citrus, Fragaria, Malus, Mangifera, Morus, Prunus, Pyrus, Rubus, Vaccinium, or any combination thereof.

In another aspect, the vegetable can include, but is not limited to, the classification of allum, crucifer, leafy green, legume or root. These include, but are not limited to, the classifications of genus Apium, Beta, Brassica, Capsicum, Cucumis, Daucus, Piper and Spinacia, or any combination thereof.

Prior to maceration or percolation, the fruit or vegetable can be processed. For example, the fruit or vegetable can be washed using techniques known in the art. Depending upon the selection of the fruit or vegetable, the entire fruit can be used or portions thereof can be removed and subsequently macerated or percolated. In one aspect, if the fruit or vegetable has seeds or pits, they can be removed prior to maceration or percolation. Finally, depending upon the selection of the fruit or vegetable, the fruit or vegetable can be ground up prior to maceration or percolation.

The fruit or vegetable is not dried or roasted prior to maceration or percolation. For example, the fruit or vegetable is not heated at temperatures greater than 100° C. in order to remove most if not all of the water present in the fruit or vegetable. Not wishing to be bound by theory, the roasting of the fruit or vegetable at temperatures greater than 100° C. would destroy many of the valuable bioactive components present in the fruit or beverage of the present invention. Thus, the methods described herein maximize the amount of isolated bioactive components present in the fruit or vegetable and confer a unique taste according to the methods described.

After the fruits or vegetables have been selected and, if necessary, processed, the fruits or vegetables are percolated or macerated with an alcoholic beverage. Not wishing to be bound by theory, percolation and maceration with the alcoholic beverage breaks down and/or complexes with the relatively more "lipophilic," more alcohol-soluble, or hydrophobic constituents of the fruit or vegetable while at the same time forming chemical complexes that confer unique chemosensory aspects and taste; the aqueous phase breaks down and/or forms complexes, with the more "hydrophilic" or water-soluble constituents present in the fruit and vegetable.

The maceration and percolation steps are performed in the presence of alcoholic beverages and/or additives that provide both the alcoholic phase and the molecular complexes conferring unique taste and chemosensory aspects. Molecular interactions and bonding between bionutrients and flavor moieties are facilitated to produce a unique taste. The molecular interactions include, but are not limited to covalent bonding, ionic bonding, hydrogen bonding, chelate complexes, Lewis acid/base interactions, and the like. The term "alcoholic beverage" is defined herein as any beverage suitable for human consumption that contains ethanol. The amount of ethanol can vary. For example, when the alcoholic beverage is a distilled spirit, it can be from 70 to 120 proof. Examples of distilled spirit useful herein include, but are not limited to, rum, vodka, whiskey, bourbon, gin, brandy, and the like. In other aspects, the alcoholic beverage can be wine. Here the wine can white wine, rose, or red wine.

The amount of alcoholic beverage relative to the fruit or vegetable can vary depending upon the selection of starting materials. In certain aspects, during the maceration and percolations steps, heat, steam, vacuum, and/or pressure can be applied in order to expedite the process and facilitate molecular interaction between bioactive components from the fruit or vegetable and flavor moieties present in the alcoholic beverage. In the case of maceration, the mixture can be agitated by stirring or other means in order to intimately mix the alcoholic beverage with the fruit and/or vegetable. In one aspect, the mixture of fruit and/or vegetable is heated up to 100° C. In another aspect, the mixture of fruit and/or vegetable is heated from 50° C. to 100° C., 60° C. to 100° C., 70° C. to 100° C., or 80° C. to 100° C.

In certain aspects, the fruit or vegetable can be macerated or percolated with water in addition to the alcoholic beverage. For example, an aqueous mixture of alcoholic beverage (e.g., alcoholic beverage further diluted with water) can be prepared and used in the maceration or percolation step. In another aspect, the fruit or vegetable is first macerated or percolated with the alcoholic beverage then water. Here, the liquid component produced with the alcoholic beverage is removed, with the resulting solid component macerated or percolated with water. Alternatively, the fruit or vegetable is first macerated or percolated with water then the alcoholic beverage in a similar manner. The maceration or percolation step can be a continuous process (i.e., the fruit or vegetable is in continuous contact with a stream of alcoholic beverage) or batch process.

In other aspects, additional organic solvents can be used in the percolations or maceration step. For example, 100% ethanol can be used in conjunction with the alcoholic beverage. Here, the ethanol can be used to remove additional components from the fruits and vegetables as needed. However, the use of 100% ethanol is separate and independent from the alcoholic beverage used in the methods described herein.

After the maceration or percolation step, a liquid component composed of the bioactive components from the fruit and/or vegetable and a solid component are produced. The liquid component can be separated from the solid component by techniques including, but not limited to, pressing, straining, filtering, or by centrifuge.

Not wishing to be bound by theory, the natural elements of the alcoholic beverage remove beneficial components present in the fruit or vegetable that are less water-soluble than they are alcohol-soluble. These beneficial elements differ in nature than those derived from only fruit or vegetable juices, both in nutritional value and in taste. Maceration or percolation with an alcoholic beverage results in bioactive complexes and chemosensory and taste complexes that distinguish them from the components present in fruit or vegetable juices.

The liquid component produced above can be further processed in order to modify the properties of the final beverage product. In one aspect, the liquid component can be heated (e.g., boiled, distilled, etc.) for a sufficient time to remove some or all of the ethanol present in the liquid component. Thus, the beverage can be an alcoholic or non-alcoholic beverage (e.g, 0.5% or less ethanol).

In another aspect, one or more additives can be added to the liquid component to produce the final beverage. For example, additives including colorants, sweeteners, glycerol, sugar alcohols, herbs, spices, additional antioxidants, flavoring agents, acids, or vitamins can be added to the liquid component. In alternate embodiment, the one or more of the optional additives listed above can be added during the maceration or percolation step (i.e, after the mixing of the fruit or vegetable with the alcoholic beverage). In another aspect, one or more additives above can be mixed with the alcoholic beverage prior to maceration or percolation.

In one aspect, the optional sweetener includes natural sweeteners. Natural sweeteners include, for example, sugar cane, sugar, molasses, sucrose, glucose, dextrose, fructose, maltose, saccharin, stevia, or any combination thereof.

In another aspect, the optional sugar alcohols include, but are not limited to, sorbitol, mannitol, or a combination thereof.

In yet another aspect, the optional herbs include, but are not limited to, astragalus, basil, bilberry, capsicum, chervil, coriander, dill, fennel, gingko biloba, green tea, marjoram, mint, oregano, rosemary, sage, tarragon, and thyme, or any combination thereof.

In a further aspect, the optional spices include, but are not limited to, allspice, anise, caraway, cardamon, cinnamon, cloves, cumin, ginger, marjoram, nutmeg, pepper, sage, tarragon, thyme, and turmeric, or any combination thereof.

In a further aspect, the optional flavorings include but are not limited to almond, amaretto, butterscotch, caramel, peppers, salt, and vanilla, or any combination thereof.

In one aspect, the optional vitamins include, but are not limited to, vitamin A, B vitamins (such as $B_1$, $B_6$, and $B_{12}$) vitamin C, vitamin D, vitamin E, or any combination thereof.

In yet another aspect, the optional antioxidants include glutathione, lipoic acid, carotenoids, uric acid, ubiquinol, flavanoids, polyphenols, polyphenolic antioxidants such as resveratrol and resveratrol extracts, or any combination thereof.

In one aspect, the optional acid can be tartaric, malic, lactic, and succinic acids.

In another aspect, a polyphenol can be added to the final beverage. For example, resveratrol can be provided as an extract.

In certain aspects, the beverages described herein contain no synthetic ingredients. For example, in one aspect, the beverages do not contain preservatives, non-naturally occurring preservatives, or any added preservatives. In other aspects, the beverages do not include pharmaceutical drugs that are considered legend drugs.

In another aspect, the beverages produced herein can be carbonated to produce a carbonated beverage. Techniques for carbonating beverages can be used herein.

In another aspect, liquid component produced by the methods described herein can be used as a fruit or vegetable composite. In this aspect, the composite can be added directly to a beverage of choice. For example, the composite can be added to tea, fruit juice, vegetable juice, milk, water, a carbonated beverage, or an alcoholic beverage.

The beverages produced herein have a unique taste combined with the beneficial nutritional components derived from the fruits or vegetables that can only be derived from the complete process as described above. Moreover, when additional additives are used during the percolation or maceration process, retained in the mixture are the benefits from molecular interactions between the additives during the percolation or maceration process.

The objectives and advantages of these processes involve both nutrient content and taste of the final beverage, via interaction of nutritional and taste elements from processing as described in the methodology above. Many elements present in fruits or vegetables that are beneficial to health are more alcohol-soluble than they are water soluble, and so are also included in the final beverage in a unique way, along with the unique resulting flavor. The taste of fruit or vegetable maceration or percolation with an alcoholic beverage that includes taste moieties, no matter what the alcohol content, produces a unique taste complex that is not duplicated by the simple addition of "juice". Additionally, fiber from the pulp may be a beneficial optional addition to the beverage derived from the percolation or maceration procedure. The methods described herein foster the simultaneous chemical interaction and capture of essential nutrients present in fruits and vegetables with varying solubility, while at the same time forming molecular complexes that confer unique taste. These complexes confer the unique taste and chemosensory quality desired in the final beverage.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed:

1. A beverage produced by the method comprising a step (a), a step (b), and a step (c):
   (a) percolating, macerating, or a combination thereof, a fruit or a vegetable with a distilled spirit selected from the group consisting of a rum, a vodka, a whiskey, a bourbon, a gin, and a brandy, and a resveratrol extract, wherein the distilled spirit and the resveratrol extract are added to the fruit or the vegetable prior to and/or during the percolating, the macerating, or to a combination thereof with the distilled spirit and the resveratrol extract to produce a first composition comprising alcohol;
   (b) heating the first composition at a temperature from 50° C. to 70° C.; and
   (c) removing alcohol from the first composition to produce the beverage with no alcohol or less than or equal to 0.5% by volume alcohol.

2. The beverage of claim 1, wherein the distilled spirit is the brandy.

3. The beverage of claim 1, further comprising the percolating and the macerating the fruit or the vegetable with water, wherein the percolating and the macerating with water is performed (i) prior to the step (a); (ii) after the step (a); or (iii) concurrently in the step (a).

4. The beverage of claim 1, wherein the step (c) is conducted at a temperature from 50° C. to less than 100° C.

5. The beverage of claim 1, further comprising adding one or more components selected from the group consisting of a sweetener, glycerol, a sugar alcohol, an herb, a spice, a vitamin, an antioxidant, a flavoring agent, an acid, and any combination thereof, wherein the one or more components are added (i) before the step (a); (ii) during the step (a); or any combination thereof to produce a second composition.

6. The beverage of claim 5, wherein the sweetener is a natural sweetener.

7. The beverage of claim 6, wherein the natural sweetener is selected from the group consisting of cane sugar, molasses, sucrose, dextrose, fructose, maltose, saccharin, stevia and any combination thereof.

8. The beverage of claim 5, wherein the vitamin is selected from the group consisting of vitamin A, B vitamins, vitamin C, vitamin D, vitamin E, and any combination thereof.

9. The beverage of claim 5, wherein the antioxidant is selected from the group consisting of glutathione, lipoic acid, carotenoids, uric acid, ubiquinol, polyphenolic antioxidants, and any combination thereof.

10. The beverage of claim 5, wherein the acid is selected from the group consisting of tartaric acid, malic acid, lactic acid, succinic acid, and any combination thereof.

11. The beverage of claim 5, wherein the herb is selected from the group consisting of astragalus, basil, bilberry, capsicum, chervil, coriander, dill, fennel, gingko biloba, green tea, marjoram, mint, oregano, rosemary, sage, tarragon, thyme, and any combination thereof.

12. The beverage of claim 5, wherein the spice is selected from the group consisting of allspice, anise, caraway, cardamom, cinnamon, cloves, cumin, ginger, marjoram, nutmeg, pepper, sage, tarragon, thyme, turmeric, and any combination thereof.

13. The beverage of claim 5, wherein the flavoring agent is selected from the group consisting of almond, amaretto, butterscotch, caramel, peppers, salt, vanilla, and any combination thereof.

14. The beverage of claim 5, wherein the sugar alcohol is selected from the group consisting of sorbitol, mannitol, and a combination thereof.

15. The beverage of claim 5, wherein the beverage contains only naturally occurring preservatives.

16. The beverage of claim 1, wherein after the step (c), carbonating the beverage to produce a carbonated beverage.

17. The beverage of claim 1, wherein the fruit or the vegetable is an entire fruit or vegetable or a portion of the fruit or vegetable.

18. The beverage of claim 1, wherein the fruit comprises pears, apples, or a combination thereof.

19. The beverage of claim 1, wherein the step (a) comprises the percolating, the macerating, or a combination thereof, the fruit or vegetable with a distilled spirit and wine.

20. A beverage produced by the method comprising
   (a) selecting a fruit or a vegetable, wherein the fruit or the vegetable is not heated at a temperature greater than 100° C.;
   (b) percolating, macerating, or a combination thereof, the fruit or the vegetable with a distilled spirit selected from the group consisting of a rum, a vodka, a whiskey, a bourbon, a gin, and a brandy, and a resveratrol extract, wherein the distilled spirit and the resveratrol extract are added to the fruit or the vegetable prior to and/or during the percolating, the macerating, or to a combi-
nation thereof with the distilled spirit and the resvera-
trol extract to produce a first composition comprising
alcohol;

(c) heating the first composition at a temperature from 50°
C. to 70° C.; and (d) removing alcohol from the first composition to pro-
duce the beverage with no alcohol or less than or equal
to 0.5% by volume alcohol.

21. A beverage produced by the method comprising (a) grinding up a vegetable or a fruit;

(b) percolating, macerating, or a combination thereof, the
fruit or the vegetable with a distilled spirit selected
from the group consisting of a rum, a vodka, a whiskey,
a bourbon, a gin, and a brandy, and a resveratrol extract,
wherein the distilled spirit and the resveratrol extract
are added to the fruit or the vegetable prior to and/or
during the percolating, the macerating, or to a combi-
nation thereof with the distilled spirit and the resvera-
trol extract to produce a first composition comprising
alcohol;

(c) heating the first composition at a temperature from 50°
C. to 70° C.; and (d) removing alcohol from the first composition to pro-
duce the beverage with no alcohol or less than or equal
to 0.5% by volume alcohol.

* * * * *